US011479175B2

United States Patent
Pampattiwar et al.

(10) Patent No.: US 11,479,175 B2
(45) Date of Patent: Oct. 25, 2022

(54) ERROR DETECTION SYSTEM AND METHOD IN A VEHICLE LIGHTING SYSTEM

(71) Applicant: Grote Industries, LLC, Madison, IN (US)

(72) Inventors: Sankalp Pampattiwar, Madison, IN (US); Yogesh Kubal, Madison, IN (US); Cesar Perez-Bolivar, Madison, IN (US)

(73) Assignee: Grote Industries, LLC, Madison, IN (US)

( * ) Notice: Subject to any disclaimer, the term of this patent is extended or adjusted under 35 U.S.C. 154(b) by 133 days.

(21) Appl. No.: 16/897,545

(22) Filed: Jun. 10, 2020

(65) Prior Publication Data

US 2020/0398751 A1    Dec. 24, 2020

Related U.S. Application Data

(60) Provisional application No. 62/864,692, filed on Jun. 21, 2019.

(51) Int. Cl.
*B60Q 11/00*    (2006.01)
*H05B 47/20*    (2020.01)

(52) U.S. Cl.
CPC .......... *B60Q 11/005* (2013.01); *H05B 47/20* (2020.01)

(58) Field of Classification Search
CPC ...... B60Q 11/005; B60Q 11/00; H05B 47/20; H05B 45/58; H05B 47/19; H05B 47/22; G07C 5/008; G07C 5/0808; G05B 2219/2637; G05B 19/042
See application file for complete search history.

(56) References Cited

U.S. PATENT DOCUMENTS

| | | | | |
|---|---|---|---|---|
| 5,828,302 A | * | 10/1998 | Tsutsumi | E05F 15/43 340/540 |
| 5,920,382 A | * | 7/1999 | Shimizu | G08G 1/166 356/3.14 |
| 6,278,382 B1 | * | 8/2001 | DeMarco | B60Q 1/2611 315/65 |
| 10,194,511 B1 | * | 1/2019 | Hieb | H05B 47/20 |
| 10,493,915 B2 | * | 12/2019 | Kobayashi | B60Q 11/005 |
| 2011/0160991 A1 | * | 6/2011 | Crombez | B60W 30/182 701/123 |

(Continued)

*Primary Examiner* — Brian Wilson
(74) *Attorney, Agent, or Firm* — Posz Law Group, PLC

(57) ABSTRACT

A vehicular error detection system is provided, comprising: a plurality of light circuits in a vehicle, each light circuit including a light and being associated with a corresponding unique identifier; a system controller located in the vehicle and configured to control operation of the light circuits; a plurality of wires connecting the light circuits to the system controller such that at least one wire is attached to each of the plurality of light circuits; a plurality of lighting error detectors each configured to detect a malfunctioning light from among corresponding lights in the light circuits, and configured to transmit an error message to the system controller when the malfunctioning light is detected, wherein each of the lighting error detectors transmits an error message to the system controller when the lighting error detector detects the malfunctioning light, and the error message includes the corresponding unique identifier of the malfunctioning light.

22 Claims, 8 Drawing Sheets

(56) References Cited

U.S. PATENT DOCUMENTS

| | | | |
|---|---|---|---|
| 2013/0173106 A1* | 7/2013 | Konishi | B60L 50/61 |
| | | | 701/22 |
| 2016/0023588 A1* | 1/2016 | Peterson | B60Q 1/444 |
| | | | 315/77 |
| 2019/0037669 A1* | 1/2019 | Hieb | H05B 47/20 |
| 2019/0111939 A1* | 4/2019 | Ulrey | B60W 50/14 |

* cited by examiner

ERROR DETECTION SYSTEM AND METHOD IN A VEHICLE LIGHTING SYSTEM

CROSS-REFERENCE TO RELATED APPLICATION

This application claims the benefit of U.S. Provisional Patent Application No. 62/864,692, filed Jun. 21, 2019, which is incorporated by reference herein in its entirety.

TECHNICAL FIELD

The present disclosure generally relates to a system for detecting errors in a vehicle lighting system that includes a plurality of lights. More particularly, the present disclosure relates to an error detection system that can identify a malfunctioning light from among a plurality of lights and identify that malfunctioning light to a system coordinator using a unique identifier.

BACKGROUND

Many vehicle lighting systems include a plurality of lights connected to a central hub or system controller via a plurality of wires or harnesses. For example, some conventional trailer lighting systems include a 7-wire harness in which multiple lights (or lamps) such as tail markers, stop lamps, turn lamps, clearance markers, and the like are connected by means of seven wires connected to a central hub (or nose box). These separate harnesses provide important assistance while driving the trailers on the road and are necessary to comply with laws pertaining to the operation of tractor trailers.

However, there are currently no systems provided to automatically detect a malfunctioning light in such a vehicle lighting system aside from visual inspection of the vehicle by a human being. This can lead to an undesirable situation in which the eventual detection of a malfunctioning light may result in a sudden downtime for the vehicle as steps must be taken to repair the faulty light without any warning. During such downtime the vehicle cannot be driven on the road, which can result in significant financial losses for the driver or the owner of the vehicle.

For example, current regulations in the United States impose certain requirements for the lighting of a tractor trailer. If one of the required lights on the trailer is burned out, the trailer cannot legally be driven until the defective light is repaired. Thus, if a burned-out light were identified during a visual inspection immediately before a trailer was scheduled to depart on a delivery, the trailer could be forced to delay its departure until the defective light was repaired. This delay in departure could upset delivery schedules with resulting financial losses for the driver or the owner of the trailer.

Typically, the driver or operator of a trailer will have to periodically survey all the lights on their truck to determine that they are functioning properly. If they identify a non-functioning light, then they must take steps to repair or replace that nonfunctioning light even if it is not convenient to do so (e.g., they have a shipment that needs to go out immediately). This can cause unnecessary delays as the trailer operator must immediately address the issue of the nonfunctioning light, since regulations require that all lights be operational for the truck to legally be driven.

Furthermore, since the trailer operator cannot constantly monitor the lights on their truck, there is also the possibility that a light will burn out in between times when the trailer operator monitors the lights on the trailer. This can result in the trailer being pulled over by a police officer for operating with a nonfunctioning light, and the trailer operator having to pay a fine.

Moreover, even if the trailer operator avoids being caught by the authorities for driving a trailer without all its lights operating properly, there remains the risk that the lack of proper lighting may cause the trailer to get into an accident. This could have the undesirable effect of causing injury to person or property. In addition, the trailer operator likewise runs the risk of being found at fault for such an accident because they were driving a trailer without its lights functioning properly.

It would therefore be desirable to provide a vehicle lighting system and method that could automatically detect the failure of an individual light and could warn the operator of the vehicle lighting system of the need to take corrective action.

SUMMARY

A vehicular error detection system is provided, comprising: a plurality of light circuits arranged in a vehicle, each of the plurality of light circuits including a light and being associated with a corresponding unique identifier; a system controller located in the vehicle and configured to control operation of the plurality of light circuits; a plurality of wires connecting the plurality of light circuits to the system controller, such that at least one of the plurality of wires is attached to each of the plurality of light circuits; a plurality of lighting error detectors each configured to detect a malfunctioning light from among corresponding lights in the plurality of light circuits, and configured to transmit an error message to the system controller when the malfunctioning light is detected, wherein each light in the plurality of light circuits is connected to at least one of the plurality of lighting error detectors, each of the plurality of lighting error detectors is configured to transmit an error message to the system controller when the lighting error detector detects the malfunctioning light, and the error message includes the corresponding unique identifier of the one of the plurality of light circuits that contains the malfunctioning light.

The plurality of wires may be configured to provide both power and control signals to the plurality of lights.

The plurality of lighting error detectors may include one of: a plurality of voltage detectors corresponding to the plurality of lights, the plurality of voltage detectors each configured to monitor a voltage drop across a corresponding one of the plurality of lights, and a plurality of current detectors corresponding to the plurality of lights, the plurality of current detectors each configured to monitor a current passing through a corresponding one of the plurality of lights.

The plurality of lighting error detectors may be configured to transmit the error information over the plurality of wires to the controller.

The vehicular-lighting error detection system may further comprise: a plurality of wireless transmitters each connected to at least one of the lighting error detectors and configured to wirelessly transmit the error information; and a wireless receiver connected to the system controller and configured to wirelessly receive the error information from one or more of the plurality of wireless transmitters, wherein each of the plurality of lighting error detectors is configured to provide the error information to at least one of the plurality of wireless transmitters.

The vehicular-lighting error detection system may further comprise: a wireless transceiver connected to the controller and configured to send information from the system controller to a remote device.

The wireless transceiver may be a cellular telephone transceiver.

The light in each of the plurality of lighting circuits may include one of a light-emitting diode, an incandescent bulb, a halogen bulb, a fluorescent bulb, or a gas-discharge tube.

Each of the plurality of light circuits may include one of the plurality of lighting error detectors such that each light circuit has a corresponding lighting error detector.

In the vehicular-lighting error detection system, at least one of the plurality of wires may provide a ground connection to each of the plurality of light circuits, and each of the plurality of light circuits may receive operational power from at least one of the plurality of wires.

At least one of the plurality of light circuits may further comprise: a false outage trigger circuit configured to cause a corresponding lighting error detector to determine that a corresponding light in the at least one of the plurality of light circuits is malfunctioning regardless of an actual status of the corresponding light.

A method for detecting errors in a vehicular lighting system containing a plurality of lights and a lighting control hub is provided, the method comprising: assigning a unique identifier to each of the plurality of lights; repeatedly monitoring each of the plurality of lights for a malfunction; determining that a first light in the plurality of lights has malfunctioned; transmitting an error message from the first light to the lighting control hub indicating that the first light has malfunctioned; generating an error signal from the lighting control hub indicating that the first light has malfunctioned, wherein the error message includes the unique identifier associated with the first light, and the error signal identifies the first light that has malfunctioned from among the plurality of lights.

The method may further comprise: generating an error notification at a warning circuit in the vehicle in response to the error signal.

The error notification may be one of an audible alarm, text displayed on a video screen, a text message sent to a mobile telephone, or an email.

The method may further comprise: transmitting the error signal to a remote location via a wireless transceiver.

The method may further comprise: determining an identifying name associated with the first light based on the unique identifier associated with the first light, wherein the error signal includes the identifying name associated with the first light.

The operation of assigning a unique identifier to each of the plurality of lights may be performed prior to initial operation of the vehicular lighting system.

The operation of assigning a unique identifier to each of the plurality of lights may be performed after initial operation of the vehicular lighting system.

The unique identifiers for the plurality of lights may be corresponding stock keeping units for the plurality of lights.

Each of the plurality of lights may include a microcontroller having a plurality of select lines, each of the select lines in the corresponding one of the plurality of lights may be connected to either a ground voltage or a non-zero power voltage, select line connections of the each of the plurality of lights may be unique, and the unique identifier for a given one of the plurality of lights may be determined based on the corresponding select line connections for the given one of the plurality of lights.

The operation of assigning a unique identifier to each of the plurality of lights may further comprise: providing a corresponding unique identifier to one of the plurality of lights during a firmware update for the one of the plurality of lights.

The vehicular lighting system may be a 7-wire harness in a trailer.

The method may further comprise: configuring the first light in the plurality of lights to appear as if it were malfunctioning regardless of the actual status of the first light prior to determining that the has malfunctioned.

The operation of configuring the first light in the plurality of lights to appear as if it were malfunctioning may be performed by opening a switch in a power line connected to the first light such that the first light is deprived of power.

BRIEF DESCRIPTION OF THE DRAWINGS

The accompanying figures where like reference numerals refer to identical or functionally similar elements and which together with the detailed description below are incorporated in and form part of the specification, serve to further illustrate an exemplary embodiment and to explain various principles and advantages in accordance with the present invention. These drawings are not necessarily drawn to scale.

DETAILED DESCRIPTION

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order (i.e., processes or steps that are not so limited may be performed in any order).

Furthermore, elements having the same number represent the same element across the various figures, and throughout the disclosure. Their description is not always repeated for each embodiment but may be inferred from previous descriptions. Elements that have the same number but have the addition of a letter designator indicate distinct embodiments of a more generic element.

Vehicle Lighting System/Error Detection System
First Embodiments

Figure 1:
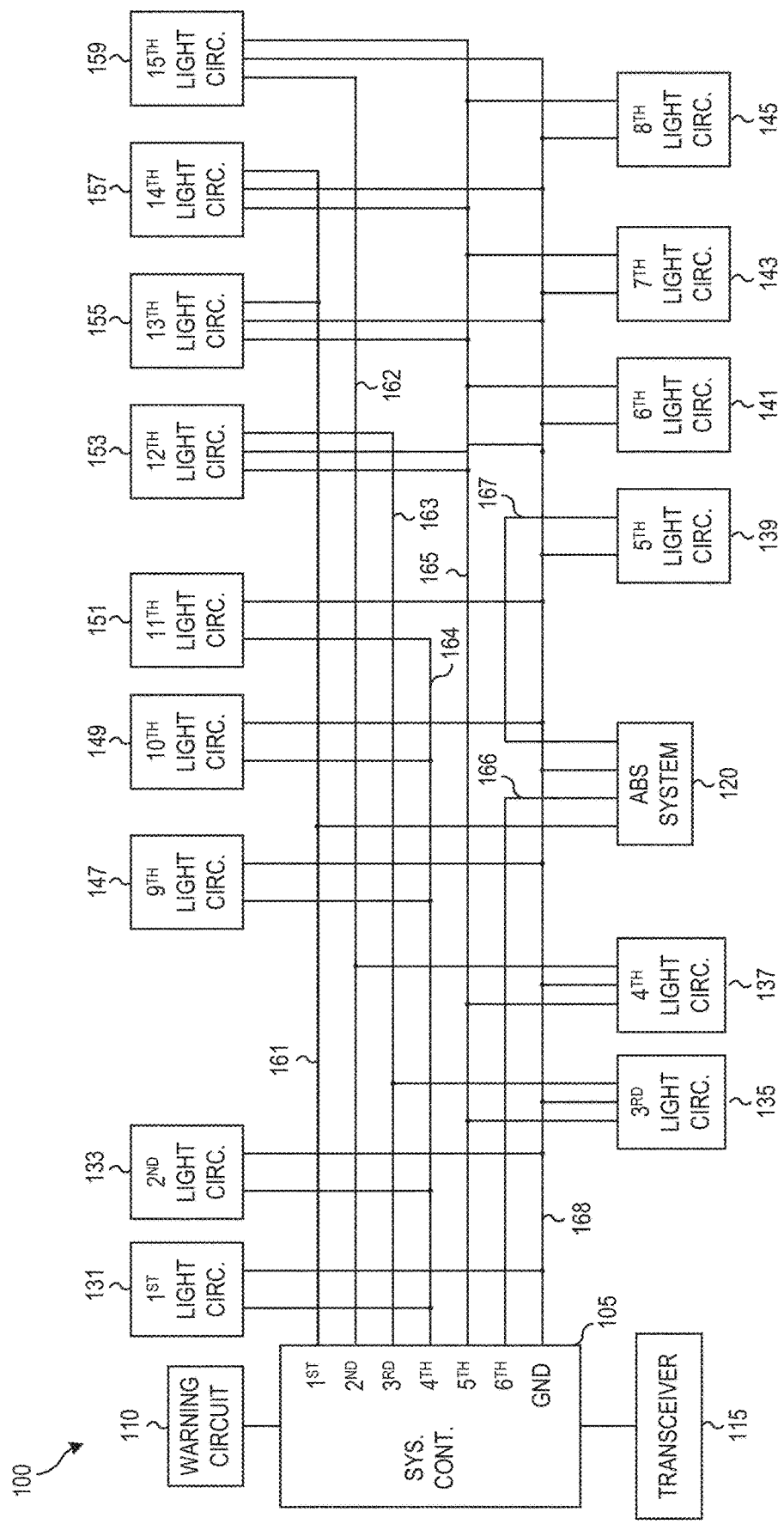
FIG. 1 is a block diagram of a vehicle lighting system according to disclosed embodiments.

FIG. 1 is a block diagram of a vehicle lighting system 100 according to disclosed embodiments. This vehicle lighting system 100 also operates as a vehicular-lighting error detection system. This vehicle lighting system 100 can be used in a vehicle trailer or any suitable vehicle.

As shown in FIG. 1, the vehicle lighting system 100 includes a system controller 105, a warning circuit 110, a transceiver 115, an anti-lock brake system (ABS) 120, a plurality of light circuits 131, 133, 135, 137, 139, 141, 143, 145, 147, 149, 151, 153, 155, 157, 159, and a plurality of wires 161, 162, 163, 164, 165, 166, 167, 168. The vehicle lighting system is contained within a vehicle, such as a car, a truck, a trailer, a boat, an airplane, etc.

The system controller 105 is located at a convenient position in the vehicle, such as a lighting control hub for the vehicle, and operates to control the ABS 120 and the plurality of light circuits 131-159. It serves as a controller and provides a plurality of power and control signals and a ground voltage to the ABS 120 and to the plurality of light circuits 131-159.

In various embodiments the system controller 105 can be a microcontroller (MCU), a digital signal processor (DSP), a field programmable gate array (FPGA) an application-specific integrated circuit (ASIC), or any appropriate element for controlling the vehicle lighting system 100.

In the embodiment of FIG. 1, the system controller 105 is a nose box in a trailer for use with a 7-wire lighting system. However, this is by way of example only. Alternate embodiments can provide a system controller 105 in various configurations provided that the system controller 105 is arranged to control the operation of a plurality of light circuits 131-159 and both receives and processes error messages from the light circuits 131-159.

The warning circuit 110 is connected to the system controller 105 and is configured to provide information locally to the operator of the vehicle based on the information received by the system controller 105 from the plurality of light circuits 131-159. In various embodiments the warning circuit 110 can include a text screen, a video screen, one or more lights, an audible alarm, or any kind of element that can convey information.

The information conveyed via the warning circuit 110 can include information as to whether a vehicular light has malfunctioned and if so, which light has malfunctioned. For example, if the warning circuit 110 included a text screen, it could display a text message indicating when one of the vehicular lights has malfunctioned and identify the malfunctioning light by name or number. If the warning circuit 110 includes an audible alarm, the alarm could sound when one of the vehicular lights malfunctioned. If the warning circuit 110 includes a plurality of lights, these lights may correspond to the vehicular lights and a malfunctioning vehicular light could be represented by an illuminated light on the warning circuit 110 that corresponds to the malfunctioning light.

The warning circuit 110 may be placed where it is easily accessible to a driver or passenger in the vehicle. For example, it could be located on the vehicle dashboard, next to a driver or passenger seat, in the cab of a truck, in the cockpit of a plane, on the bridge of a boat, etc.

The transceiver 115 is a wireless transceiver that communicates wirelessly with a remote location such as a central dispatching office, a control tower, a warehouse, a maintenance shop, or other location that coordinates the operation of the vehicle. In the embodiment of FIG. 1, the transceiver is a cellular telephone device, though this is by way of example only. Any kind of transceiver that can connect with a remote location (e.g., satellite telephone, radio, etc.) can be used in alternate embodiments.

The system controller 105 can use the transceiver 115 to transmit information from error messages received at the system controller 105 to a location remote from the vehicle. For example, the system controller 105 could use the transceiver to send error information to a remote dispatch office, a remote maintenance facility, a remote warehouse, etc. This can allow the remote locations to begin processing the lighting malfunction as soon as it is identified, reducing the amount of time it will take to correct the malfunction.

The ABS 120 operates to control the braking operation of the vehicle to prevent the brakes from locking up during braking. The ABS 120 can be omitted in any vehicle that does not include brakes.

The plurality of lighting circuits 131-159 are arranged at various locations throughout the vehicle and operate to generate light either to illuminate an area for the driver to see or to provide warnings to other vehicles. For example, the lighting circuits 131-159 may include headlamps, turn signals, running lamps, parking lamps, clearance lamps, identification lamps, marker lamps, backup lamps, license plate lamps, roof lamps, and the like. In many jurisdictions, the law requires that all these lamps function properly for the vehicle to be legally operated.

Figure 2:
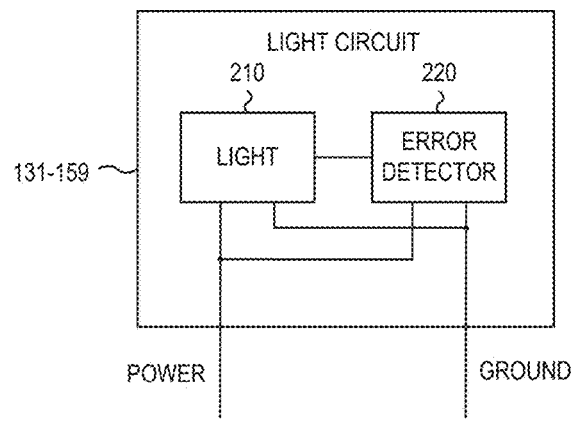
FIG. 2 is a block diagram of the lighting circuits of FIG. 1 according to disclosed embodiments.

FIG. 2 is a block diagram of the lighting circuits 131-159 of FIG. 1 according to disclosed embodiments. As shown in FIG. 2, a lighting circuit 131-159 includes a light 210 and an error detector 220.

The light 210 can be any element that converts electricity into light. In the disclosed embodiments the light 210 is a lighting structures that includes one or more light-emitting diodes (LEDs). However, alternate embodiments can employ other kinds of lights such as incandescent lights, fluorescent lights, halogen lights, gas-discharge lights (e.g., neon lights), or the like.

The light 210 can be an individual light or a group of light elements that function together to form a single lighting unit. For example, if LEDs are used for the light 210, a string of LEDs can be arranged together to provide the required illumination. The various lights 210 in the various light circuits 131-159 need not be identical and in many cases will vary significantly in structure. For example, a light circuit 131-159 operating as a headlamp will typically have a different light 210 than a light circuit 131-159 operating as a running lamp, which will typically have a different light 210 than a light circuit 131-159 operating as a backup lamp, etc.

The error detector 220 is connected to a corresponding light 210 and operates to detect whether or not the light 210 is malfunctioning, i.e., whether the light 210 is burned out or otherwise failing to produce the desired amount of light. In one embodiment, the error detector 220 could be a voltage detector configured to detect a voltage drop across a corresponding light 210. Such a voltage detector would generate an error message indicating that the corresponding light 210 was malfunctioning if the detected voltage varied from an expected voltage by more than a first threshold above or a second threshold below. In another embodiment, the error detector 220 could be a current detector configured to detect a current passing through a corresponding light 210. Such a current detector would generate an error message indicating that the corresponding light 210 was malfunctioning if the detected current varied from an expected current by more than a first threshold above or a second threshold below. These voltage or current thresholds can be periodically or continually updated in some embodiments to account for the wear of the corresponding light 210.

However, the use of a voltage detector or a current detector as the error detector 220 is by way of example only. Alternate embodiments can employ any circuit that accurately determines whether a light 210 is malfunctioning as an error detector 220.

In the case where multiple light elements are used for a single light 210, different embodiments of the error detector 220 are possible. In one embodiment, an error detector 220 determines that a light 210 is malfunctioning when even a single light element (e.g., LED) in the string is non-functional. In other embodiments, an error detector 220 determines that the light 210 is malfunctioning when a certain threshold number of light elements are non-functional.

The error detectors 220 of these embodiments are connected to at least one of the plurality of wires 161-168 and are configured to use power-line communication to transmit an error signal to the nose box over one of the wires 161-168. Power line communication adds a modulated carrier signal to an existing power line and transmits data using the modulated carrier signal. This can be done creating a current change event on the line, which is detected as a moving average change, though other change triggers can be used in alternate embodiments.

In this embodiment in which data (e.g., an error message) is transmitted from the error detector 220 to the system controller 105 regarding a corresponding malfunctioning light 210, the system controller 105 must modulate the voltage on the line, a current sensor is added in a receiver to decipher these current changes and extract the data. Data transmitted using power-line communication can also undergo a cyclic redundancy check or other data validation technique to determine the correctness of the transmitted data.

When transmitted data is to be interpreted at the system controller 105, each light circuit 131-159 uses additional current paths to change the total current drawn by the light circuit, such that a binary message is created. This can be done by creating two different current levels which are detected using a moving average change (or the like). The two current levels are treated as 1's or 0's, respectively, allowing data to be transmitted. In operation, each light circuit 131-159 operates independently of each of the other light circuits 131-159.

Figure 3:
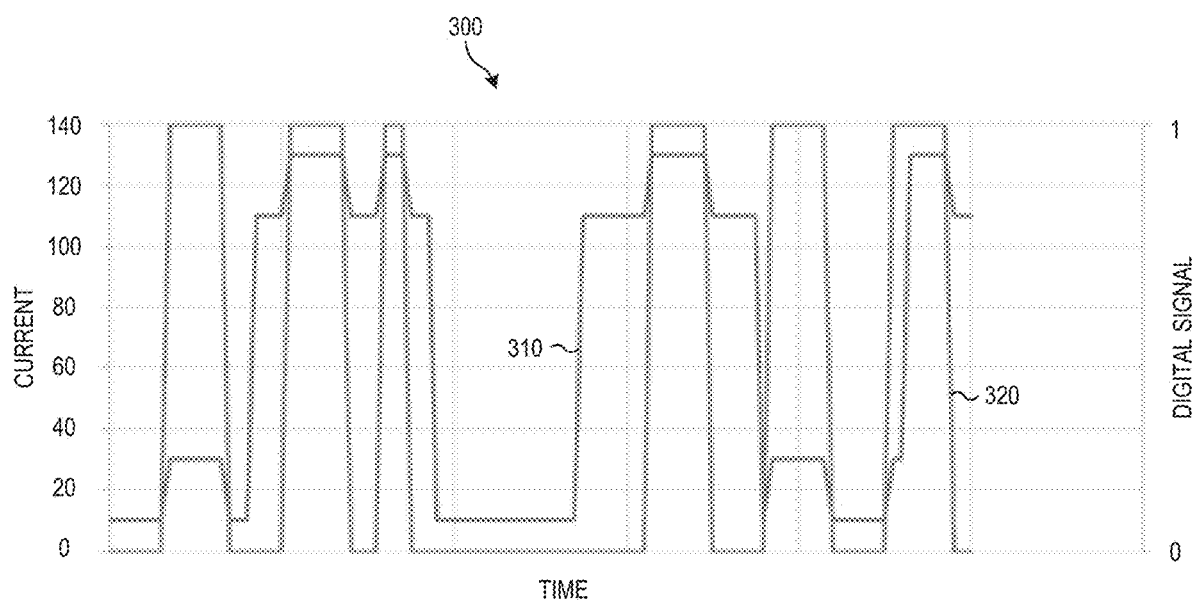
FIG. 3 is a graph of a power-line communication signal according to disclosed embodiments.

FIG. 3 is a graph of a power-line communication signal 300 according to disclosed embodiments. As shown in FIG. 3, a total transmitted current 310 is provided, with a data signal 320 overlaid over the total transmitted current 310.

When the error detector 220 determines that an associated light 210 is malfunctioning, the error message it transmits to the system controller 105 will include a notification that a malfunctioning light 210 was detected, and a unique identifier that identifies the malfunctioning light 210/light circuit 131-159 from among the plurality of lights 210/light circuits 131-159.

Although the above description refers to the error detector 220 in the light circuit 131-159 as only transmitting an error message, the light circuit 131-159 could also send other information as well. For example, the light circuit 131-159 could transmit a status message to the system controller 105 indicating a current status of a corresponding light 210.

Although the embodiments of FIGS. 1 and 2 disclose light circuits 131-159 that include an error detector 220 corresponding to each light 210, alternate embodiments could employ fewer error detectors 220, with a single error detector 220 being provided for a plurality of lights 210 and being configured to detect errors in the plurality of lights 210. Such an embodiment could include some light circuits 131-159 with an error detector 220 and some light circuits 131-159 without an error detector 220, or could be arranged so that no light circuit 131-159 includes an error detector 220 and the error detectors 220 are provided separately from the light circuits 131-159.

In the embodiment of FIG. 1, the plurality of lighting circuits 131-159 include first through fifteenth lighting circuits. However, this is by way of example only. Alternate embodiments can include more or fewer lighting circuits 131-159.

Although the embodiment of FIG. 1 discloses that the error detectors 220 in the light circuits 131-159 are configured to transmit an error message to the system controller 105 and that the system controller 105 is configured to receive the error message from the error detectors 220 in the light circuits 131-159, this represents a minimum requirement. Some embodiments can employ transceivers in both the system controller 105 and the light circuits 131-159 so that messages can be transmitted both from the light circuits 131-159 to the system controller 105 and from the system controller 105 to the light circuits 131-159. Some embodiments will include a light controller in some or all of the light circuits 131-159 that operates to coordinate the operation of the light 210 and the error detector 220. A transmitter or transceiver used to communicate with the system controller 105 could be a part of the error detector 220, a part of a light controller, or a separate circuit in various embodiments.

The plurality of wires 161-168 are wires used to control the operation of the light circuits 131-159. In the embodiment of FIG. 1, they are power lines and a ground line used to provide power to the light circuits 131-159, allowing the lights 210 in the light circuits 131-159 to illuminate and to allow the error detectors 220 to have power to operate. As noted above, these wires 161-168 also provide a medium for data to be transmitted between the system controller 105 and the light circuits 131-159 using power-line communication.

In operation, the disclosed vehicle lighting system 100 can detect a failure on each of the individual light circuits 131-159 on a vehicle and convey that information back to the system controller 105, which serves as a central junction or master node. The system controller 105 can provide this error information to either or both of a vehicle operator or a fleet operator via the warning circuit 110 and the transceiver 115, depending upon what is desired. If there is a failure in any of the light circuits 131-159 on the vehicle, the vehicle or fleet operator can receive immediate notice of the failure allowing them to correct the failure without delay. In some embodiments it is also be possible to send the error message to a maintenance facility or warehouse associated with the vehicle, identifying what light malfunctioned. This will allow the warehouse to quickly provide a replacement light and the maintenance facility to arrange a time and place to accommodate the repair of the malfunctioning light circuit 131-159, potentially reducing the downtime required for repairing the broken light circuit 131-159.

Alternate embodiments can also employ a self-healing lighting system in which one or more backup lights are provided for each existing light 210. The self-healing system will immediately switch to a backup light or light string when the system 100 determines that a light 210 has malfunctioned. The error message will still be generated by a corresponding error detector 220 and be forwarded to the system controller 105 identifying the exact light 210 that has malfunctioned. This information can be provided to all who need it to arrange for a lighting repair before the backup light also burns out. In this way, a proper correction can be made for any light malfunction without a corresponding light circuit 131-159 actually ceasing to function properly.

An example of a self-healing lighting system is provided in U.S. patent application Ser. No. 16/268,689, filed on Feb. 6, 2019 and entitled "SELF-REPAIRING LIGHTING SYSTEM AND METHOD," the contents of which are hereby incorporated by reference in their entirety.

Identification of lights in a vehicle lighting system/error detection system

For the vehicle lighting system 100 disclosed above to properly identify malfunctions in the light circuits 131-159, the system controller 105 must be able to uniquely identify each of the light circuits 131-159 (or properly the lights 210 in the light circuits 131-159). With a unique identifier for each individual lighting circuit 131-159/light 210, an error message sent by an error detector 220 to the system controller 105 can include the unique identifier for the corresponding light circuit 131-159/light 210 in which the error was detected. This can allow the system controller 105 to identify exactly which light 210 has malfunctioned.

To achieve this, each individual light 210 in a light circuit 131-159 should be assigned a unique identifier. For example, this unique identifier can represent a location at which the light circuit 131-159 is installed on the vehicle or the type of light 210 used in the light circuit 131-159. This makes it possible to properly identify precisely which light 210 has malfunctioned in the system 100.

There are multiple ways in which to provide a unique identifier in an vehicle lighting system 100. Three options are described below. However, these are by way of example only. Alternate ways of assigning a unique identifier to each light circuit 131-159/light can be provided. The three disclosed ways of providing unique identifiers for each light circuit 131-159 are: (1) using stock keeping units (SKUs) as unique identifiers for the lights 210, (2) using select lines to set unique identifiers for the lights 210, and (3) using an firmware update to set unique identifiers for the lights 210.

If the unique identifiers are assigned based on SKUs, each light circuit 131-159/light 210 is assigned its unique identifier during or after a manufacturing process based on the SKU for that particular light 210. In this embodiment, the term "stock keeping unit" refers to the unique identifier that a manufacturer or purchaser assigns to a purchased item. In some cases, the SKU is unique only to a given type of light 210; in others the SKU is unique to each individual light unit.

If the system intends to employ a unique SKU for each light unit, the assignment of the SKU for each light 210 can be achieved by actively programming each individual light 210 on the vehicle with a different identifier (SKU) before installation. Alternatively, if a unique SKU will only be provided for each different kind of light unit, the lights 210 can each be provided with a unique identifier by manufacturing completely different lights 210 for each different function and/or installation location on a vehicle.

Using SKUs as unique identifiers, each light circuit 131-159/light 210 will have its unique identifier prior to the installation of the light circuit 131-159 on the vehicle. Assigning individual SKUs to each of the lights 210 in the vehicle lighting system 100 enables a vehicle operator or fleet operator identify the specific light 210 that has failed.

Alternatively, a unique identifier can be assigned to each light circuit 131-159/light 210 using the concept of select lines. In this way, a light controller associated with each light circuit 131-159/light 210 will have number of select lines based on the total number of lamps connected in the system. Specifically, each light 210 will require at least N select lines, where the total number of lights 210 is less than or equal to $2^N$. A select line is a hardware connection that directly connects each of a plurality of select lines (or select pins) of a light controller to either a power line or a ground line. With N lines, each of which can be connected to either power or ground, there are $2^N$ unique configurations, allowing for $2^N$ unique identifiers. Based on the values read by the associated light controller (ground or power, corresponding to values of "0" and "1") the controller assigns a unique identifier to itself. This unique identifier can then be used by the error detector 220 in further communications from that light circuit 131-159 to the system controller 105. If jumper cables are used for the light controller in each light circuit 131-159, the assigned unique identifiers for each light circuit 131-159 can be easily modified as needed by altering the jumper cables.

Figure 4:
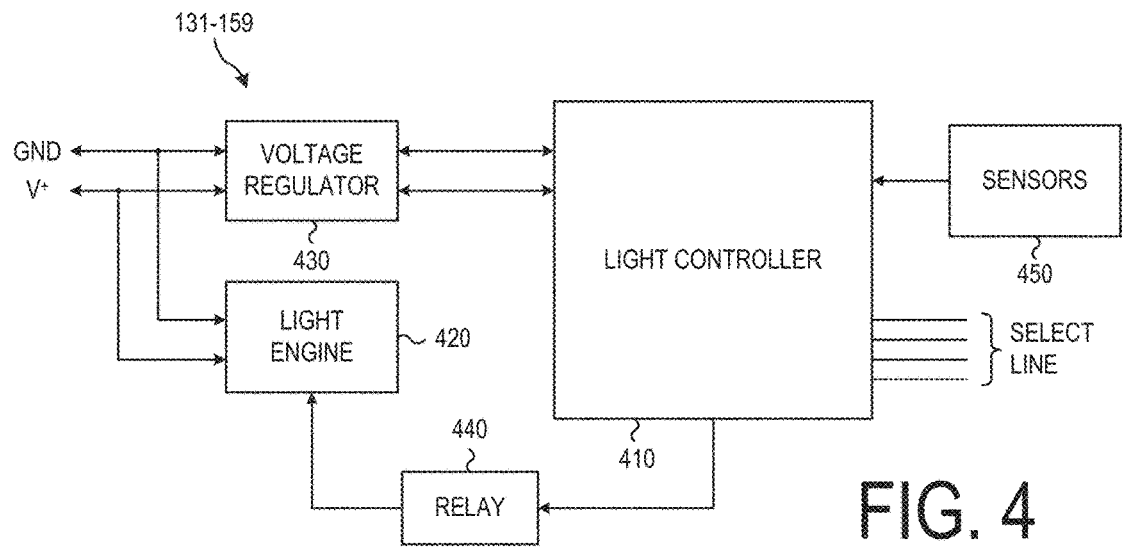
FIG. 4 is a block diagram of a light circuit of FIG. 1 according to disclosed embodiments.

FIG. 4 is a block diagram of a light circuit 131-159 of FIG. 1 according to disclosed embodiments. As shown in FIG. 4, a light circuit 131-159 includes a light controller 410, a light 210, a voltage regulator 420, a relay 430, and one or more sensors 440.

The light controller 410 controls the operation of the light circuit 131-159. It receives a supply voltage from the ground and V⁺ lines via the voltage regulator 430 and sensor signals from the sensors 450. It provides control signals to the light engine 420 via the relay 440 and can transmit data signals to the power and ground lines via the voltage regulator 430. A separate circuit (not shown) is required on parallel with the light engine 420 to pull additional current required for data transmission. In various embodiments the light controller 410 can be a microcontroller (MCU), a digital signal processor (DSP), a field programmable gate array (FPGA) an application-specific integrated circuit (ASIC), or any appropriate element for controlling the light circuit 131-159.

The light controller 410 in this embodiment includes a plurality of select lines that are each connected to either a ground line or a power line. As noted above, the light controller 410 reads the voltage on each of these lines and based on those voltages generates a unique identifier for the light circuit 131-159. In one embodiment this unique identifier can be a binary number using the select lines as digits, with a select line connected to a ground line representing a "0" and a select line connected to a power line representing a "1." Thus, in this embodiment if a light controller 410 had four select lines that were connected to a power line, a power line, a ground line, and a power line, respectively, the light circuit 131-159 containing the light controller 410 would have a unique identifier of 1101.

In the embodiment of FIG. 4, four select lines are shown. This is by way of example only. The number of select lines can vary up and down based on the number of light circuits 131-159 provided on the vehicle.

The light engine 420 represents the actual elements that convert electricity into light. The light engine can include one or more LEDs, incandescent lights, fluorescent lights, halogen lights, neon lights, or the like. The light engine 420 is connected to ground and V+ to provide power to operate the light engine 420, receives control signals from the light controller 410 via the relay 440, which instruct the light engine 420 how to operate.

The voltage regulator 430 is connected between the ground and V+ lines and the light controller 410 and operates to convert the voltages supplied by the ground and V+ lines to appropriate voltages to be used by the light controller 410. In embodiments in which the light circuit 131-159 transmits information to the system controller 105 using power-line communication, separate circuitry (not shown) can be provided to convert information signals provided by the light controller 410 into voltages appropriate for transmission over the ground and V+ lines.

The relay 430 operates to relay instructions from the light controller 410 to the light 210.

The one or more sensors 450 operate to monitor the operation of the light engine 420. Specifically, they monitor one or more parameters of the light engine 420 (e.g., a voltage across one or more elements in the light engine 420, a current passing through the light engine 420, etc.). The one or more sensors 450 provide sensor signals regarding the parameters of the light engine 420 to the light controller 410, which uses these parameters to determine if the light engine 420 is malfunctioning. In the alternative, other types of sensor data can be used to control the light engine 420. For example, a sensor can be provided to monitor light conditions surrounding the vehicle, and action can be taken (e.g., activating certain lights) if the sensor detects poor light conditions.

With respect to FIG. 2, the light 210 corresponds to the light controller 410, the light engine 420, the voltage regulator 430, and the relay 440, while the error detector 220 corresponds to the light controller 410, the voltage regulator 430, and the one or more sensors 450.

Another way to assign a unique identifier to each light circuit 131-159 is to program the identifier into the light circuit 131-159 in the field (i.e., after manufacturing) using a wired or wireless communication method. One example of this is to generate the unique identifier using a firmware update. A more specific example is it generate the unique identifier using an over-the-air (OTA) firmware update. (An OTA firmware update is a wireless firmware update.) Using this option, even if a unique SKU is provided only to each different type of light, a unique identifier can still be provided even if all the lights 210 are manufactured using same hardware.

Once a set of light circuits 131-159 are installed on the vehicle, they can be reprogrammed to perform their required function using a firmware update. According to this option, the firmware update is also used to assign the light circuits 131-159/lights 210 their unique identifiers.

Figure 5:
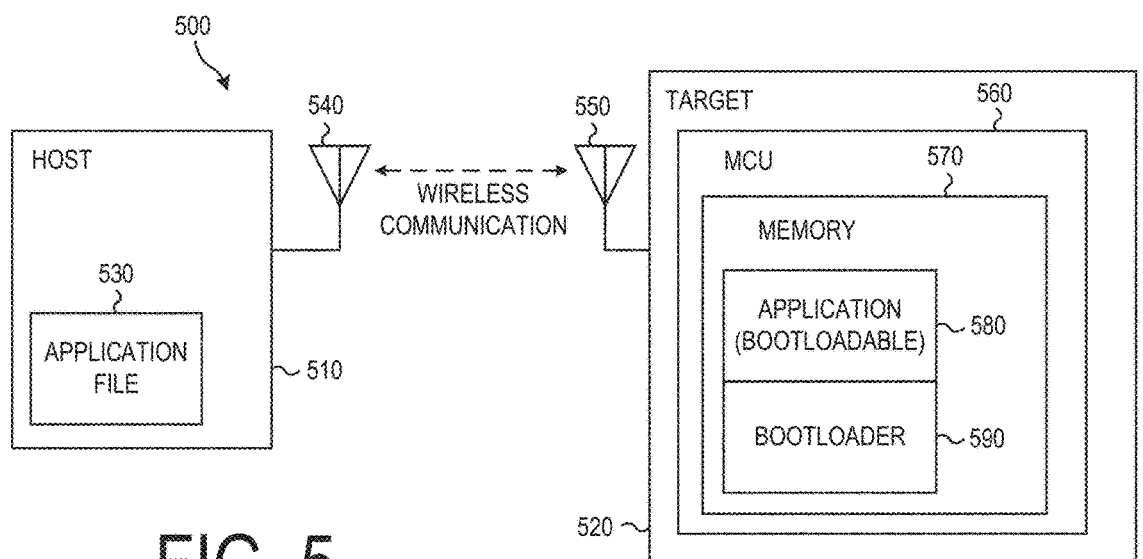
FIG. 5 is a block diagram of a wireless OTA firmware update according to disclosed embodiments.

FIG. 5 is a block diagram of a wireless OTA firmware update according to disclosed embodiments. As shown in FIG. 5, the firmware update is achieved by providing the firmware update from a host 510 (e.g., a host microprocessor) to a target 520 (e.g., a target microprocessor). The host 510 includes an application file 530 and is connected to a host antenna 540. The target 520 is connected to a target antenna 550 and includes a microcontroller (MCU) 560. The MCU 560 includes a memory 570, which contains a bootloadable application 580 and a bootloader 590.

The host 510 corresponds to the system controller 105 in FIG. 1. It operates to control a plurality of targets 520, part of which control involves updating the programs and data used by the targets to operate independently.

The target 520 corresponds to the light circuits 131-159 in FIG. 1. Each target 520 operates to control the light 210 in a corresponding light circuit 131-159 based on instructions received from the host 510 and the application 580 stored in the target's memory 570.

The application file 530 provides instructions for the host to operate and indicates what information should be in the bootloadable application 580 in the target's memory 580. During an OTA update, target 520 enters into a bootloader mode and waits for an application file 530 from host over the wireless communication. After successful reception, the application file 530 is directly written into the bootloadable area 580 of the memory 570.

The host antenna 540 and the target antenna 550 are antennas (and associated transmission circuitry) that allow for the wireless transmission of data using a particular transmission protocol (e.g., cellular, Bluetooth, Bluetooth Low Energy, WiFi, etc.). The two antennas 540, 550 are of the same type and allow wireless communication between the host 510 and the target 520.

The target MCU 560 is the element that controls the operation of the target (i.e., the light circuit 131-159). It performs this control based on instructions received from the host 510 and the application 580 stored in the target's memory 570.

The memory 570 is a non-volatile memory contained in the target MCU 570. In various embodiments it can be RAM, EEPROM, flash memory, or any other suitable non-volatile memory.

The bootloadable application 580 is contained in the memory 570 and provides the instructions necessary for the operation of the target 520 (i.e., the light circuit 131-159).

The bootloader 590 provides the instructions necessary to boot up and run the bootloadable application 580.

In operation, an OTA firmware update involves the host 510 providing for the delivery of new software or data to the target 520. Specifically, during an OTA firmware update, the host 510 will provide information for altering the bootloadable application 580 or any associated data.

Using this option to provide each light circuit 131-159/light 210 with a unique identifier, the host 510 can provide each target 520 (i.e., each light circuit 131-159) with a unique identifier as part of the data updated during the OTA firmware update. The unique identifiers can be set any time an OTA firmware update is performed, meaning that the unique identifier for each target 520 (i.e., light circuit 131-159/light 210) can be set after manufacturing and even altered during the operation of the system, 100. Furthermore, since an OTA update would typically have to be performed periodically, the setting of a unique identifier for each target 520 (light circuit 131-159/light 210) can be achieved without significant additional effort.

Although FIG. 5 discloses a wireless OTA firmware update, wired firmware updates are also possible. In such an embodiment, the antennas 520, 540 can be replaced with a wired connection.

An advantage of using a firmware update to set unique identifiers over the others is that remote firmware update is possible even after the installation of the light circuits 131-159 is complete. It does not require the generation of additional SKUs, the use of unique light circuits 131-159, or the manual setting of select lines in each light circuit 131-159. In addition, firmware updates can be programmed using a wired or wireless communication protocol or technique, making this a flexible option. Under this option, any suitable communication protocol or technique can be used to program a unique identifier into the light circuits 131-159 using a firmware update.

Vehicle Lighting System/Error Detection System
Second Embodiments

Although FIGS. 1 and 2 disclose embodiments in which a wired connection is used to transmit error messages from error detectors 220 to a system controller 105, this is by way of example only. Alternate embodiments can provide a wireless connection between the light circuits and a system controller, allowing error detectors to wirelessly transmit error messages to the system controller.

Figure 6:
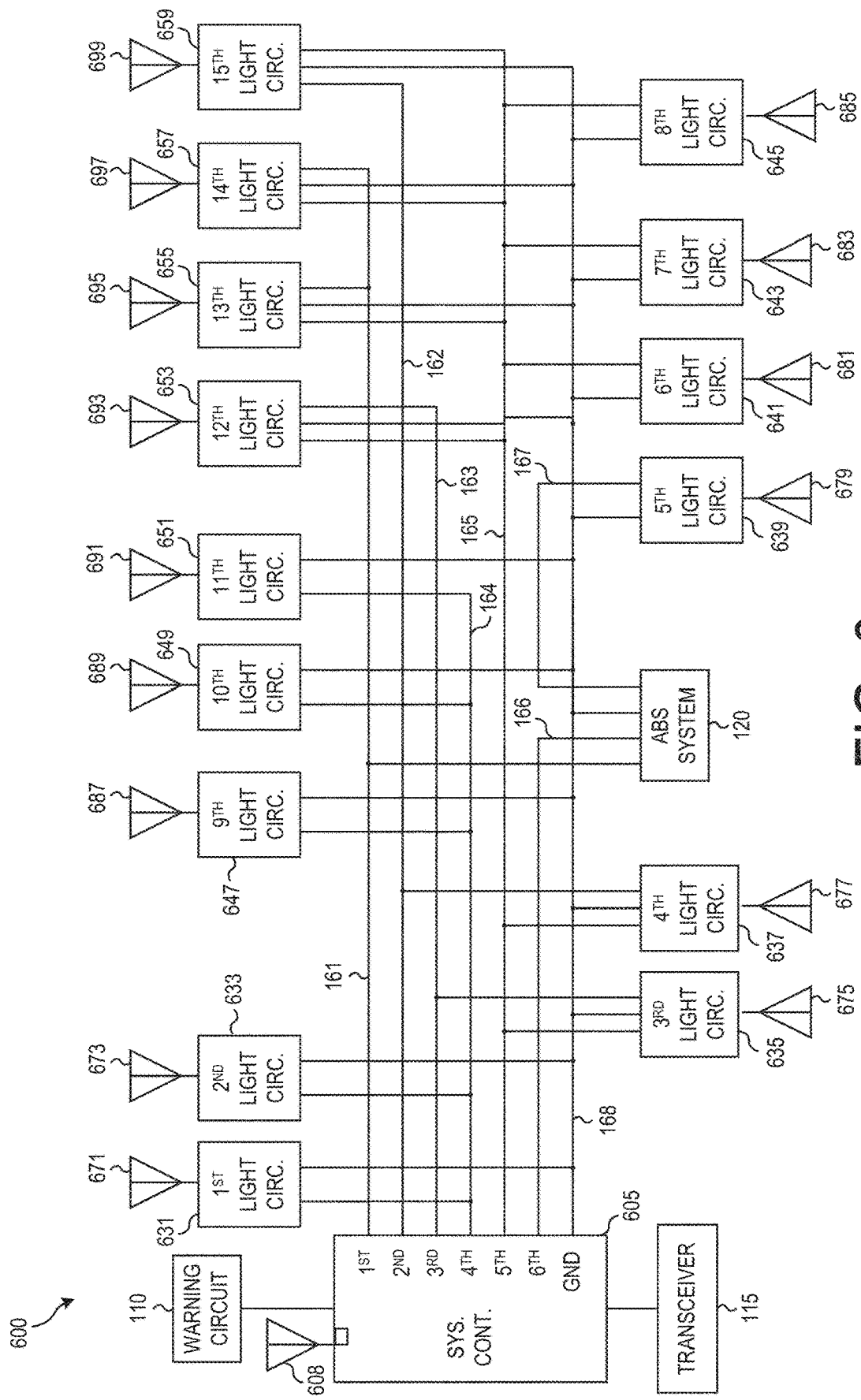
FIG. 6 is a block diagram of a vehicle lighting system according to disclosed embodiments.

FIG. 6 is a block diagram of a vehicle lighting system 600 according to disclosed embodiments. This vehicle lighting system 600 also operates as a vehicular-lighting error detection system and can be used in a vehicle trailer or any suitable vehicle. This vehicle lighting system 600 uses wireless data transmission between light circuits and a system controller.

As shown in FIG. 6, the vehicle lighting system 600 includes a system controller 605, a system antenna 608, a warning circuit 110, a transceiver 115, an anti-lock brake system (ABS) 120, a plurality of light circuits 631, 633, 635, 637, 639, 641, 643, 645, 647, 649, 651, 653, 655, 657, 659, a plurality of wires 161, 162, 163, 164, 165, 166, 167, 168, and a plurality of light antennas 671, 673, 675, 677, 679, 681, 683, 685, 687, 689, 691, 693, 695, 697, 699. The vehicle lighting system 600 is contained within a vehicle, such as a car, a truck, a trailer, a boat, an airplane, etc.

Elements with similar numbers operated as described above with respect to the vehicle lighting system 100 of FIG. 1. A description of these elements will not be repeated below.

The system controller 605 operates substantially as the system controller 105 discussed with respect to the embodiment of FIG. 1, except that it is configured to communicate wirelessly with the light circuits 631-659.

The system antenna 608 is a wireless antenna that allows the system controller 605 to wirelessly send and receive data to and from the plurality of light circuits 631-659.

The plurality of light circuits 631-659 operate substantially as the light circuits 131-159 discussed with respect to the embodiment of FIG. 1, except that they are configured to communicate wirelessly with the system controller 605.

The plurality of light antennas 671-699 are wireless antennas that allow the plurality of light circuits 631-659 to wirelessly send and receive data to and from the system controller 605.

The system antenna 608 and the plurality of light antennas 671-699 should operate using the same data transmission protocol so that they can communicate with each other. In various embodiments this data transmission protocol could be Bluetooth, WiFi, cellular, or any wireless protocol suitable for short-range communication.

Although FIG. 6 discloses that each light circuit 631-659 includes its own light antenna 671-699 to allow for wireless communication to the system controller 605, this is by way of example only. Alternate embodiments could include light antennas 671-699 with only some of the light circuits 631-659, but not all. In other embodiments some light circuits 631-659 might share light antennas.

Figure 7:
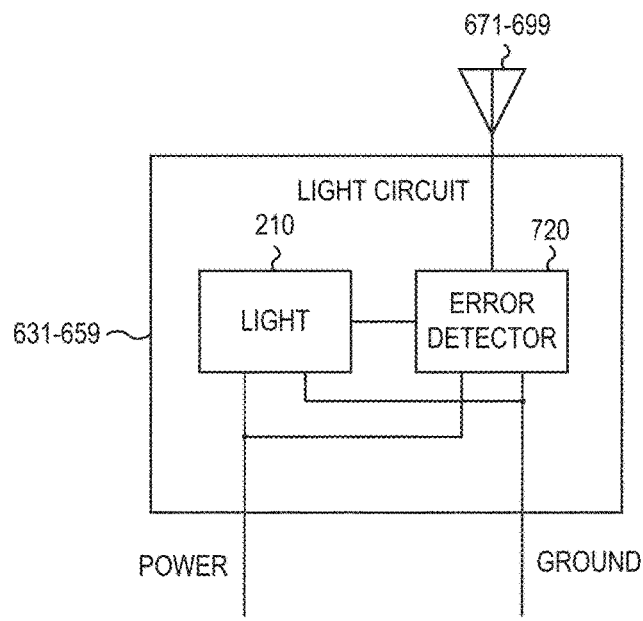
FIG. 7 is a block diagram of the lighting circuits of FIG. 6 according to disclosed embodiments.

FIG. 7 is a block diagram 700 of the lighting circuits 631-659 of FIG. 6 according to disclosed embodiments. As shown in FIG. 7, a lighting circuit 631-659 includes a light 210 and an error detector 720. Each lighting circuit 631-659 is connected to a corresponding light antenna 671-699.

Elements with similar numbers operated as described above with respect to the vehicle lighting system 100 of FIG. 2. A description of these elements will not be repeated below.

The error detector 720 operates substantially as the error detector 220 discussed with respect to the embodiment of FIG. 2, except that it is configured to communicate wirelessly with the system controller 605 using a corresponding light antenna 671-699.

In this embodiment when data (e.g., an error message) is transmitted from the error detector 720 to the system controller 605 regarding a corresponding light 210, the data (error message) is sent using a wireless transmission protocol between a corresponding light antenna 671-699 and the system antenna 608.

Alternate Embodiments

Although FIGS. 1 and 6 disclose the use of power-line communication and wireless communication between the system controller 105 and the plurality of light circuits 131-159, this is by way of example only. Alternate embodiments could use different ways of communicating between the light circuits 131-159 and the system controller 105. For example, dedicated wired connections could be provided between the light circuits 131-159 and the system controller 105. Any suitable connection protocol or connection arrangement can also be used to allow communication between the light circuits 131-159 and the system controller 105.

In addition, other alternate embodiments could mix communications protocols, allowing each light circuit 131-159 to use a communication protocol most appropriate to its situation. For example, some light circuits 131-159 might have a direct data connection to the system controller 105, some light circuits 131-159 might communicate using power-line communication, and some light circuits 131-159 might communicate using wireless transmissions. Any combination of available transmission protocol is possible.

False Outage Trigger Events

Another technique possible using the lighting system 100 disclosed above is to create a false outage by triggering pre-programmed short and open events in a particular light circuit 131-159. This can be done by adding two switches to the light 210 in each light circuit 131-159 that are controlled by a light microcontroller (MCU). By opening and closing these switches, the system 100 can create false outages (i.e., shorts or opens) at a given light circuit 131-159.

The false outages created in a given light circuit 131-159 can then be detected by a corresponding error detector 220 and the system controller 105 will be notified of the false error as if it were a real error.

A series of change triggers can be pre-programmed in the system controller 105 to be interpreted as a particular event that corresponds to a specific location.

Figure 8:
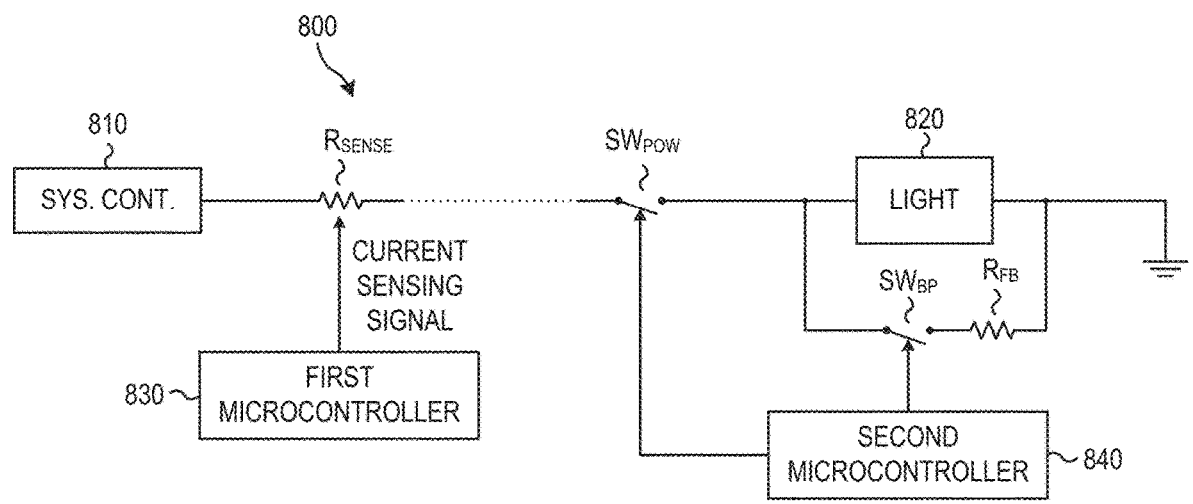
FIG. 8 is a block diagram of a vehicle lighting system arranged to allow the creation of false outages.

FIG. 8 is a block diagram of a vehicle lighting system 800 arranged to allow the creation of false outages. As shown in FIG. 8, the vehicle lighting system 800 includes a system controller 810, a light 820, a first microcontroller 830, a second microcontroller 840, a sense resistor $R_{SENSE}$, a bypass resistor $R_{BP}$, a power switch $SW_P$, and a bypass switch $SW_{BP}$.

The system controller 810 corresponds to the system controller 105, 605 in the embodiments of FIGS. 1, 2, 6, and 7. It is configured to control the operation of the light 820 just as the system controller 105 controls the operation of the lights 210 in the embodiment of FIGS. 1 and 2. It is further configured to receive an error message from a light circuit when an error is detected in the light circuit. This error message can be received via a wired transmission (e.g., using power-line communication) or via a wireless transmission.

The system controller 810 provides at least one power line and at least one ground line to each light engine 820. FIG. 8 shows a power line connected between the system controller 810 and the light engine 820.

The light 820 corresponds to the light 210 in FIGS. 2 and 7 and operates as described above with respect to FIG. 2.

The sense resistor $R_{SENSE}$ is a resistor on the power line. It is used by a sensor (not shown) to generate a current sensing signal that identifies a current passing through the light 820.

The bypass resistor $R_{BP}$ is a resistor on the bypass line.

The power switch $SW_{BP}$, is a single pole single throw switch located on a power line provided between the system controller 810 and the light engine.

The bypass switch $SW_{BP}$ is a single pole single throw switch located on a bypass line that is in parallel with the light engine.

A bypass line is provided to bypass the light 820. This bypass line includes the bypass resistor $R_{BP}$ and the bypass switch $SW_{BP}$. Then the bypass switch $SW_{BP}$ is open, current will only pass through the light 820 and it will operate normally However, should the bypass switch $SW_{BP}$ be closed, current can pass through the bypass line as well as the light 820. As a result, the current passing through the light 820 will be reduced based on the relative values of the resistance of the light 820 and the resistance of the bypass resistor $R_{BP}$.

The first microcontroller 830 receives the current sensing signal from the sense resistor $R_{SENSE}$/sensor that identifies a current passing through the light 820. The first microcontroller 830 compares the current sensing signal with an expected current that should pass through the light 820 if it was fully functional. If the first microcontroller 830 determines that the current sensing signal is above the expected current by more than a first threshold or below the expected current by more than a second threshold, it will determine that there is a malfunction (i.e., outage) in the light 820 and send an error message to the system controller 810 indicating that the light 820 is malfunctioning.

The second microcontroller 840 controls the operation of the power switch $SW_{POW}$ and the bypass switch $SW_{BP}$. In operation, if the second microcontroller 840 opens the power switch $SW_{POW}$, no current will flow through the power line to the light. This will cause the light 820 to stop operating and will cause the current sensing signal to drop to zero. The first microcontroller 830 will then identify the light 820 as malfunctioning based on the drop in the current sensing signal.

Although FIG. 8 discloses a separate first microcontroller 830 identifying a current sensing signal and a second microcontroller 840 controlling the operation of the power switch $SW_P$ and the bypass switch $SW_{BP}$, this is by way of example only. In alternate embodiments a single microcontroller could perform both functions.

Although FIG. 8 discloses that the system controller 810 is connected to only a single light engine 820 that is configured to generate a false outage, this is by way of example only. Any or all of a plurality of other light engines 820 in the vehicle lighting system 800 can also be configured as shown in FIG. 8 to allow for false outages for those light engines.

Method of Detecting an Error in a Vehicular Lighting System

First Embodiments

Figure 9:
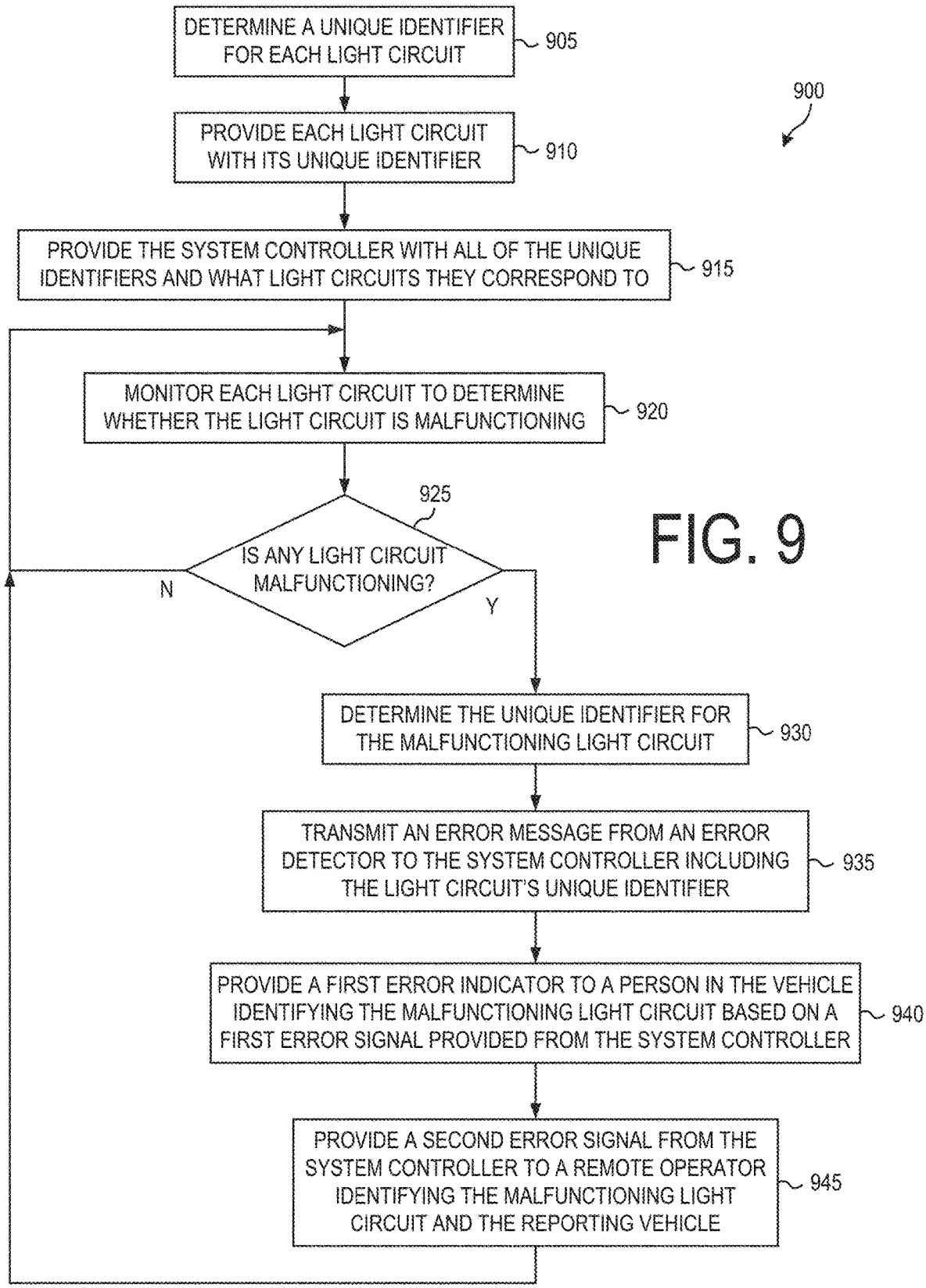
FIG. 9 is a flow chart describing a method of detecting an error in a vehicular lighting system according to disclosed embodiments.

FIG. 9 is a flow chart describing a method of detecting an error in a vehicular lighting system 900 according to disclosed embodiments.

As shown in FIG. 9, operation begins by determining a unique identifier for each of a plurality of light circuits in the vehicle lighting system (905). The unique identifier for each of the plurality of light circuits can be a number, an alphanumeric phrase, or the like. In one embodiment the unique identifier is the SKU associated with light circuit or a light contained within the light circuit. In another embodiment, the unique identifier is one of a series of sequential binary values. Many other types of identifier are possible.

After a unique identifier is determined for each of the plurality of light circuits (905), the unique identifiers are provided to each light circuit (910). In some embodiments this operation will be performed prior to the light circuit beginning operation or even before the light circuits are installed on a vehicle. In other embodiments this operation can be performed at a later point, including after the light circuit has started operation.

In some embodiments the light circuits will be provided with their unique identifier by an operator providing them with a unique SKU associated with the light circuit or a light within the light circuit prior to the light circuit beginning operation or even prior to the installation of the light circuits on the vehicle. In some embodiments the light circuit can be designed to automatically identify its associated unique SKU without any additional action by an operator.

In other embodiments the light circuits will be provided with their unique identifiers by connecting a plurality of select lines in each light circuit to either ground or a power voltage. In these embodiments each light circuit will include a microcontroller that has a plurality of select lines that can be connected to either ground or the power voltage. By connecting the select lines in each light circuit according to a unique connection pattern, the light circuits can each be provided with its unique identifier.

The select line connections can correspond to plurality of binary values with each select line connected to ground representing a "0" and each select line connected to the power voltage representing a "1" (this could be reversed in other embodiments). Thus, according to one embodiment, if each light circuit included four select lines and the select lines in a given light circuit were connected to ground, ground, power voltage, and ground, respectively, that light circuit would have a unique identifier of 0010. In such an embodiment the number N of select lines should be chosen such that $2^N$ is greater than or equal to the total number of light circuits in the vehicle lighting system.

It would be efficient to use the smallest number of select lines necessary. Therefore, N can be selected to be the smallest number that satisfies the above limitation. In such a case, the light circuits can be assigned a series of sequential binary numbers. However, alternate embodiments can set N to be any desired value. In some embodiments it may be useful to set N to be larger than is currently needed to allow the expansion of the vehicle lighting system to accommodate additional light circuits in the future.

In an embodiment that employs select lines to set the unique identifiers, the select lines must be manually set for each light circuit, which will typically be done prior to the start of operation of the vehicle. However, in such an embodiment the unique identifier for a given light circuit can be altered at a later date by manually changing the configuration of the connections of the select lines.

In other embodiments the unique identifier can be directly provided to the light circuits by an operator either through a wired or wireless connection, before or after operation of the vehicle lighting circuit begins. One way this can be achieved is by sending the unique identifier to the light circuit in a firmware update. If this firmware update is wireless, it can be referred to as an over-the-air (OTA) firmware update.

A firmware update is a process by which new software, updated software, or new data is provided to a remote device by a central controller (e.g., a system controller). In such an embodiment, the unique identifier for each light circuit can be included in the new/updated software and data being provided to the light circuit. In this way the unique identifier can be sent to a light circuit at any time and can be changed as needed simply by performing a firmware update for the light circuit.

A system controller should also be provided with all the unique identifiers and additional information as to what light circuits they correspond to (915). This additional information can include a plain text description of the light circuit, an identification of the location of the light circuit on the vehicle, or any other desirable information for identifying the light circuit. For example, the system controller could be provided with information indicating that a unique identifier of 0000 corresponds to a front left headlamp, a unique identifier of 0001 corresponds to a front right headlamp, a unique identifier of 0010 corresponds to a rear left brake light, etc.

Once all of the information regarding unique identifiers is provided to the light circuits and the system controller, the vehicle lighting system begins its error detection function and starts monitoring each light circuit to determine whether the light circuit (or the light within the light circuit) is malfunctioning (925). This operation can be performed in a variety of ways, but two possible implementations are to either monitor a voltage drop across a light within the light circuit or monitor a current passing through the light within the light circuit. In these embodiments if the monitored voltage or current drops below an expected value by a first threshold or rises above the expected value by a second threshold, the light/light circuit will be considered to malfunction. In various embodiments the first and second thresholds can be the same or different. Furthermore, during operation of the light circuit the expected value for either voltage or current can be periodically or continually updated to account for the aging of the light within the light circuit.

Although the disclosed embodiments involve monitoring a voltage drop across a light or a current passing through a light to determine whether the light is malfunctioning, this is by way of example only. Alternate embodiments can employ any suitable operation for determining whether a light circuit/light is malfunctioning.

If it is determined that there is no light circuit malfunctioning in the vehicle lighting system (925), then the system returns to monitoring each light circuit to determine whether the light circuit is malfunctioning (920).

If, however, the system determines that one of the light circuits/lights is malfunctioning, then an error detector must first determine the unique identifier of the malfunctioning light circuit (930). This can be achieved in many embodiments by simply reading the unique identifier from a memory in the malfunctioning light circuit. However, in some alternate embodiments an error detector might contain the unique identifier information, or some other mechanism for determining the unique identifier of a malfunctioning light circuit may be used.

Once the unique identifier for the malfunctioning light circuit is determined, an error message is transmitted from an error detector to a system controller, the error message including the unique identifier for the malfunctioning light (935). In this way, the system controller is provided an indication not only that a light has malfunctioned in the vehicle lighting system, but also information uniquely identifying exactly which light has malfunctioned.

The system controller then provides a first error indicator to a person in the vehicle (e.g., a vehicle operator) identifying the malfunctioning light circuit (940) based on a first error signal generated at the system controller and the information regarding the light circuits stored in a memory associated with the system controller. The system controller identifies the malfunctioning light circuit based on the unique identifier received from the error detector, provides a first error signal to a warning circuit in the vehicle that identifies the malfunctioning light circuit, and the warning circuit provides a first error indicator to the person in the vehicle identifying the malfunctioning light circuit. The first error indicator may contain the unique identifier, or it may include a different indicator of which light circuit is malfunctioning.

For example, in one embodiment the first error signal can be provided to a text screen as a warning circuit, which can generate a first error indicator that includes a brief description of the malfunctioning light circuit. For example, the first error signal could instruct the text screen to provide a first error indicator that reads, "FRONT LEFT HEADLAMP MALFUNCTIONING," if the unique identifier for the malfunctioning light circuit identified the front left headlamp. This would allow someone in the vehicle to identify which light circuit malfunction based on the text message provided. Other text messages are of course possible.

In another embodiment, the first error signal can be used instruct a visual display that acts as a warning circuit to provide the first error indicator by illuminating a light corresponding to the malfunctioning light circuit. For example, a dashboard display might include a plurality of indicator lights corresponding to each of the light circuits in the vehicle lighting system. In such an embodiment, the first error signal could instruct the dashboard display to illuminate the indicator light corresponding to the malfunctioning light circuit as a first error indicator. This would allow someone in the vehicle to visually identify which light circuit has malfunctioned based on which dashboard indicator light was illuminated.

In some embodiments, the first error indicator could also include an audible component. For example, the first error indicator could include an audible alarm in place of or in addition to a visual or text display. If the audible alarm was in addition to a visual cortex display, it could be used to draw the attention of someone in the vehicle to focus their attention on a dashboard display or a text screen that could include the remainder of the first error indicator identifying the specific light circuit that has malfunctioned.

It should be understood that these ways of providing a first error indicator to a person in the vehicle are by way of example only. Any system that can identify that a light circuit has malfunctioned and identify the malfunctioning light circuit can be used.

The system controller also provides a second error signal to a remote operator identifying the malfunctioning light circuit and the reporting vehicle (945). The second error signal may contain the unique identifier associated with the malfunctioning light circuit, or it may include other information identifying the malfunctioning light circuit (e.g., a name of the malfunctioning light circuit, a location of the malfunctioning light circuit, etc.). Since the remote operator may well be monitoring multiple vehicles, the second error signal will often include a unique identifier for the vehicle itself (e.g., a vehicle number, a vehicle name, a vehicle operator's name). However, in embodiments in which only a single vehicle is being monitored or in which an identification of the reporting vehicle is otherwise not required, this information can be omitted from the second error signal.

The second error signal is generally targeted to a recipient that is a relatively long distance away (miles at least). Therefore, the second error signal is generally sent wirelessly using a wireless transmission protocol suitable for long-range transmission of data. This wireless transmission protocol can include cellular data transmission, radio, satellite telephone, and the like.

In various embodiments, the remote operator could be a vehicle dispatcher, a warehouse operator, a maintenance shop, etc. By providing the second error signal to the remote operator, this provides the remote operator with an immediate notification that a light has malfunctioned on the vehicle and an identification of the exact light that has malfunctioned. This provides the remote operator with an opportunity to prepare to quickly remediate the malfunctioning light. For example, a vehicle dispatcher would be able to immediately recall the vehicle or note that as soon as it arrives at a destination it should address the malfunctioning light. A warehouse operator would be able to immediately acquire a replacement light and immediately arrange for it to be provided to the vehicle or a garage scheduled to repair the malfunctioning light. A warehouse operator would also be able to immediately order a new replacement light to maintain inventory. A maintenance shop would be able to immediately schedule a time for the light on the vehicle to be repaired, avoiding the possibility that there would be no garage space or trained personnel available when the vehicle arrives at the maintenance shop.

Furthermore, in some embodiments, the second error signal can be provided to multiple remote operators at the same time. For example, in one embodiment the second error signal could be provided to all of a vehicle dispatcher, a warehouse operator, the maintenance shop. Different combinations of recipients for the second error signal are, of course, possible.

By providing the second error signal to one or more remote operators, the remote operators can receive advanced warning that the vehicle needs a repair and information regarding the specific light that has malfunctioned. This allows the one or more remote operators to take immediate action to prepare for repairing the vehicle. In this way, the repair may be performed more quickly and efficiently, reducing downtime for the vehicle, and avoiding the possibility of the vehicle operating with a malfunctioning light.

Although this embodiment discloses sending both a first error signal from the system controller to the vehicle operator and a second error signal from the system controller to a remote operator, this is by way of example only. Alternate embodiments could provide only one of the first error signal or the second error signal.

Once a first error indicator has been provided to a person in the vehicle and a second error signal has been sent to one or more remote operators, the system then returns to monitoring each light circuit to determine whether the light circuit is malfunctioning (920).

Figure 10:
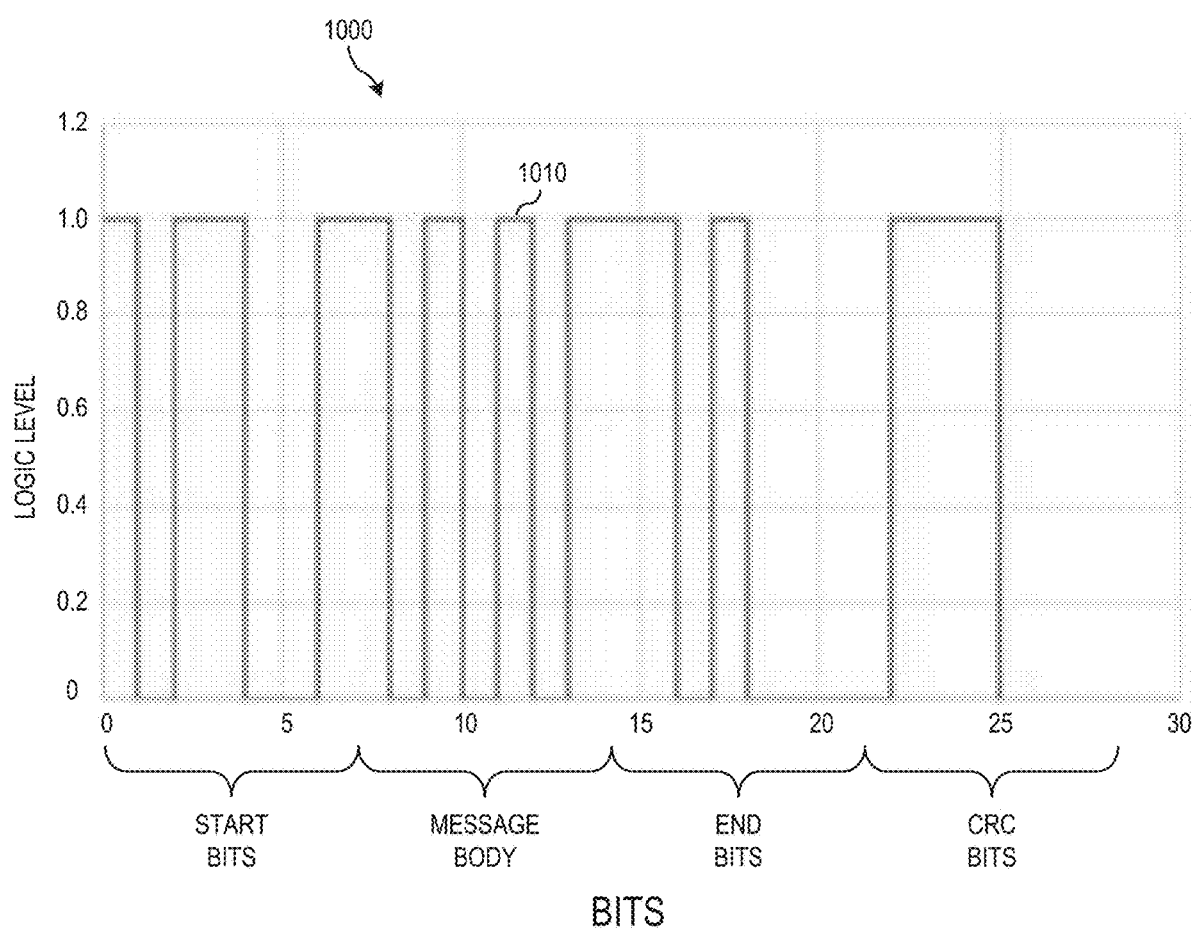
FIG. 10 is a graph 1000 of an exemplary message format that can be used in transmitting the error message from the error detector to the system controller according to disclosed embodiments.

FIG. 10 is a graph 1000 of an exemplary message format that can be used in transmitting the error message from the error detector to the system controller according to disclosed embodiments. As shown in FIG. 10, a signal 1010 may include a plurality of start bits, a message body, a plurality of end bits, and a plurality of cyclic redundancy check (CRC) bits. The operation of the start bits, and bits, and CRC bits will be understood by one of ordinary skill in the art. The message body would include information such as the unique identifier associated with the malfunctioning light circuit.

The signal 1010 shown in FIG. 10 is by way of example only. Other message formats for transmitting the error message are possible, as will be understood by one of ordinary skill in the art. The signal 1010 may be a wired signal sent by a direct wire between the error detector and the system controller or using power-line communication over a power line between the error detector in the system controller. Alternatively, the signal 1010 may be a wireless signal sent wirelessly between the error detector and the system controller.

Method of Detecting an Error in a Vehicular Lighting System

Second Embodiments

Figure 11:
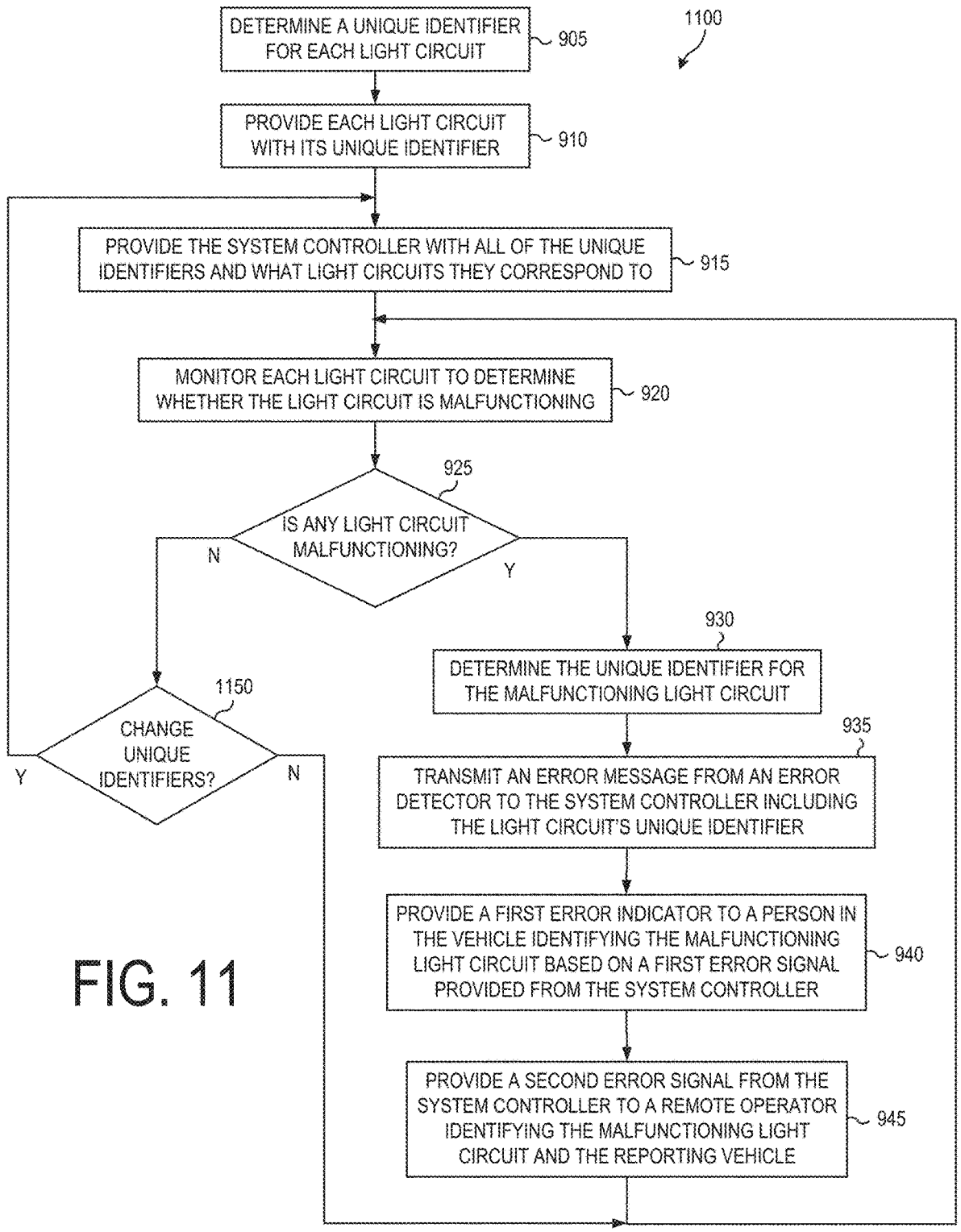
FIG. 11 is a flow chart describing another method of detecting an error in a vehicular lighting system according to disclosed embodiments.

FIG. 11 is a flow chart 1100 describing another method of detecting an error in a vehicular lighting system according to disclosed embodiments. In this embodiment, it is possible to alter the unique identifiers during the course of operation of the vehicle.

Operations with similar numbers operate as described above with respect to the operation 900 of a detecting an error in a vehicle lighting system of FIG. 9. A description of these elements will not be repeated below.

As shown in FIG. 11, operation proceeds substantially as described above with respect to the operation 900 of FIG. 9. The only difference is that after it is determined that there are no of light circuits malfunctioning (925), instead of immediately returning to monitor each light circuit to determine whether the light circuit is malfunctioning (920), the system instead determines whether an operator wishes to change the unique identifiers assigned to one or more of the light circuits (1150).

If the operator does not wish to change any of the unique identifiers assigned to the one or more light circuits, then operation proceeds to monitor each light circuit to determine whether the light circuit is malfunctioning (920).

If, however, it is determined that an operator wishes to change one or more unique identifiers assigned to the one or more light circuits (1150), then the operation proceeds to determine a unique identifier for each light circuit (905), provide each light circuit with its unique identifier (910), and provide the system controller with all of the unique identifiers and what light circuits that correspond to (915).

It may be that in determining a unique identifier for each light circuit only some of the unique identifiers will change. In that case, the operations of providing each light circuit with its unique identifier (910) may involve only providing each light circuit whose unique identifier has changed with its new unique identifier, and providing the system controller with all of the unique identifiers and what light circuits that correspond to (915) may include only providing the system controller with information regarding the new unique identifiers and what light circuits they correspond to.

This method can be used in situation in which the unique identifiers are changeable. For example, it can be applicable to an embodiment in which the unique identifiers are set by connecting select lines in a light circuit to either a ground line or a power line. In this embodiment, the unique identifier for a given light circuit can be changed by altering the connection pattern for the select lines in that light circuit. Likewise, this method can be applicable to an embodiment in which the unique identifiers are sent to the light circuits either by wired or wireless transmission (e.g., in a firmware update). In this case the unique identifier for a given light circuit can be changed by providing the new unique identifier in a later transmission (e.g., a later firmware update).

As shown in FIG. 11, in this embodiment it can be possible to alter the unique identifiers after the vehicle lighting system has begun operation.

Conclusion

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled. The various circuits described above can be implemented in discrete circuits or integrated circuits, as desired by implementation.

What is claimed is:

1. A vehicular error detection system, comprising:
    a plurality of light circuits arranged in a vehicle, each of the plurality of light circuits including a light and being associated with a corresponding unique identifier;
    a system controller located in the vehicle and configured to control operation of the plurality of light circuits;
    a plurality of wires connecting the plurality of light circuits to the system controller, such that at least one of the plurality of wires is attached to each of the plurality of light circuits; and
    a plurality of lighting error detectors each configured to detect a malfunctioning light from among corresponding lights in the plurality of light circuits, and configured to transmit an error message to the system controller when the malfunctioning light is detected,
    wherein
    each light in the plurality of light circuits is connected to at least one of the plurality of lighting error detectors,
    each of the plurality of lighting error detectors is configured to transmit the error message to the system controller when the lighting error detector detects the malfunctioning light, and
    the error message includes the corresponding unique identifier of the one of the plurality of light circuits that contains the malfunctioning light,
    wherein the plurality of wires are configured to provide both power and control signals to the plurality of lights.

2. The vehicular error detection system of claim 1, wherein the plurality of lighting error detectors include one of: a plurality of voltage detectors corresponding to the plurality of lights, the plurality of voltage detectors each configured to monitor a voltage drop across a corresponding one of the plurality of lights, and a plurality of current detectors corresponding to the plurality of lights, the plurality of current detectors each configured to monitor a current passing through a corresponding one of the plurality of lights.

3. The vehicular error detection system of claim 1, wherein the plurality of lighting error detectors are configured to transmit the error message over the plurality of wires to the system controller.

4. The vehicular error detection system of claim 1, wherein the light in each of the plurality of lighting circuits includes one of a light-emitting diode, an incandescent bulb, a halogen bulb, a fluorescent bulb, or a gas-discharge tube.

5. The vehicular error detection system of claim 1, wherein each of the plurality of light circuits includes one of the plurality of lighting error detectors such that each light circuit has a corresponding lighting error detector.

6. The vehicular error detection system of claim 1, wherein at least one of the plurality of wires provides a ground connection to each of the plurality of light circuits, and each of the plurality of light circuits receives operational power from at least one of the plurality of wires.

7. A vehicular error detection system, comprising:
    a plurality of light circuits arranged in a vehicle, each of the plurality of light circuits including a light and being associated with a corresponding unique identifier;
    a system controller located in the vehicle and configured to control operation of the plurality of light circuits;
    a plurality of wires connecting the plurality of light circuits to the system controller, such that at least one of the plurality of wires is attached to each of the plurality of light circuits;
    a plurality of lighting error detectors each configured to detect a malfunctioning light from among corresponding lights in the plurality of light circuits, and configured to transmit an error message to the system controller when the malfunctioning light is detected; and
    a false outage trigger circuit configured to cause a corresponding lighting error detector to determine that a corresponding light in the at least one of the plurality of light circuits is malfunctioning regardless of an actual status of the corresponding light,
    wherein each light in the plurality of light circuits is connected to at least one of the plurality of lighting error detectors,
    each of the plurality of lighting error detectors is configured to transmit the error message to the system controller when the lighting error detector detects the malfunctioning light, and
    the error message includes the corresponding unique identifier of the one of the plurality of light circuits that contains the malfunctioning light.

8. The vehicular error detection system of claim 7, further comprising:
    a plurality of wireless transmitters each connected to at least one of the plurality of lighting error detectors and configured to wirelessly transmit the error message; and
    a wireless receiver connected to the system controller and configured to wirelesly receive the error message from one or more of the plurality of wireless transmitters,
    wherein each of the plurality of lighting error detectors is configured to provide the error message to at least one of the plurality of wireless transmitters.

9. The vehicular error detection system of claim 7, further comprising:
a wireless transceiver connected to the system controller and configured to send information from the system controller to a remote device.

10. The vehicular error detection system of claim 9, wherein the wireless transceiver is a cellular telephone transceiver.

11. A method for detecting errors in a vehicular lighting system containing a plurality of lights and a lighting control hub, the method comprising:
assigning a unique identifier to each of the plurality of lights;
repeatedly monitoring each of the plurality of lights for a malfunction;
determining that a first light in the plurality of lights has malfunctioned;
transmitting an error message from the first light to the lighting control hub indicating that the first light has malfunctioned;
generating an error signal from the lighting control hub indicating that the first light has malfunctioned; and
determining an identifying name associated with the first light based on the unique identifier associated with the first light,
wherein
the error message includes the unique identifier associated with the first light,
the error signal identifies the first light that has malfunctioned from among the plurality of lights, and
the error signal includes the identifying name associated with the first light.

12. The method of claim 11, further comprising: generating an error notification at a warning circuit in a the vehicle in response to the error signal.

13. The method of claim 12, wherein the error notification is one of an audible alarm, text displayed on a video screen, a text message sent to a mobile telephone, or an email.

14. The method of claim 11, further comprising:
transmitting the error signal to a remote location via a wireless transceiver.

15. The method of claim 11, wherein the operation of assigning a unique identifier to each of the plurality of lights is performed prior to initial operation of the vehicular lighting system.

16. The method of claim 11, wherein the operation of assigning a unique identifier to each of the plurality of lights is performed after initial operation of the vehicular lighting system.

17. The method of claim 11, wherein the unique identifiers for the plurality of lights are corresponding stock keeping units for the plurality of lights.

18. The method of claim 11, wherein
each of the plurality of lights includes a microcontroller having a plurality of select lines,
each of the select lines in the corresponding one of the plurality of lights is connected to either a ground voltage or a non-zero power voltage,
select line connections of the each of the plurality of lights are unique, and
the unique identifier for a given one of the plurality of lights is determined based on the corresponding select line connections for the given one of the plurality of lights.

19. The method of claim 11, wherein the operation of assigning a unique identifier to each of the plurality of lights further comprises:
providing a corresponding unique identifier to one of the plurality of lights during a firmware update for the one of the plurality of lights.

20. The method of claim 11, wherein the vehicular lighting system is a 7-wire harness in a trailer.

21. The method of claim 11, further comprising: configuring the first light in the plurality of lights to appear as if it were malfunctioning regardless of an actual status of the first light prior to determining that the first light has malfunctioned.

22. The method of claim 21, wherein
the operation of configuring the first light in the plurality of lights to appear as if it were malfunctioning is performed by opening a switch in a power line connected to the first light such that the first light is deprived of power.

* * * * *